March 13, 1962 O. L. HIBBARD ET AL 3,025,368

PROGRAM DEVICE

Filed Aug. 7, 1958 2 Sheets-Sheet 1

INVENTORS
OSCAR L. HIBBARD
EMORY F. STODDARD
BY [signature]
AGENT

United States Patent Office 3,025,368

Patented Mar. 13, 1962

3,025,368

PROGRAM DEVICE

Oscar L. Hibbard, Johnson City, and Emory F. Stoddard, Vestal, N.Y., assignors to International Business Machines Corporation, New York, N.Y., a corporation of New York Filed Aug. 7, 1958, Ser. No. 753,684

6 Claims. (Cl. 200—46)

This invention relates to a tape controlled program device; in particular, it is addressed to a novel feed and storage mechanism for an endless program tape.

Most program machines for controlling electrical circuits according to a predetermined program employ bulky mechanical arrangements, endless tapes of a kind requiring elaborate and space consuming facilities for handling the tape, or other program bearing media for selectively closing the predetermined work circuits. The present program apparatus may be distinguished from such conventional apparatus in that a self-contained magazine or tape housing unit containing a coiled endless program tape which is demountably attached to the program unit is adapted to be readily coupled to, and readily uncoupled from, the tape driving mechanism of the program device. A loop of tape projecting from the tape housing unit engages with a tape feeding drum and is intermittently advanced through a tape sensing station. Tape sensing brushes through selectively positioned perforations in the program tape engage with a conductive surface of the tape feeding drum to complete work circuits. The utilized portion of the loop of tape is then engaged by another drum which serves to rewind the tape as an inner convolution to the roll of tape. A manually operated punch mechanism is attached to the program device for selectively introducing circuit controlling perforations into the tape, as desired. The present invention is primarily adapted for use in connection with the automatic control of electrical circuits for carrying out a predetermined program, as for example, the closing or opening of one or more electrical circuits at predetermined times of a day or week. Apparatus of this type is admirably well adapted for opening and closing electrical circuits for performing various scheduled operations according to some desired program. The present program control is adapted to be driven in response to a timing device so that the schedule is completed in a day or week, as desired, and the circuit controlling instrument is capable of adjustment or alteration to permit ready revision to the program tape.

The present program device is however capable of other uses and the same may if desired, with or without modification, be employed for a wide variety of uses as for example to operate machinery at predetermined times or to electrically control or initiate certain functions regardless of their nature according to a time schedule. Irrespective, however, of the specific use to which the present program device may be put, the essential features of the invention are at all times preserved.

The principal object of the invention is to provide an improved compact program device.

A further object of the invention is to provide an improved compact mechanism for an endless tape that may be removably attached to a utilization device.

A further object of the invention is to provide an improved means for feeding an endless program tape.

A still further object of the invention is to provide an improved endless tape storing device that will facilitate the handling of a program tape.

Another object of the invention is to provide a program device which is relatively simple in its construction and positive in its operation.

Another object of the invention is to provide a program device which is comprised of a minimum number of moving parts and which consequently is unlikely to get out of order.

Still another object of the invention is to provide a program device which is rugged and durable and which is therefore possessed of a comparatively long life.

Other objects of the invention will be pointed out in the following description and claims and illustrated in the accompanying drawings, which disclose, by way of examples, the principle of the invention and the best mode, which has been contemplated, of applying that principle.

Figure 1:
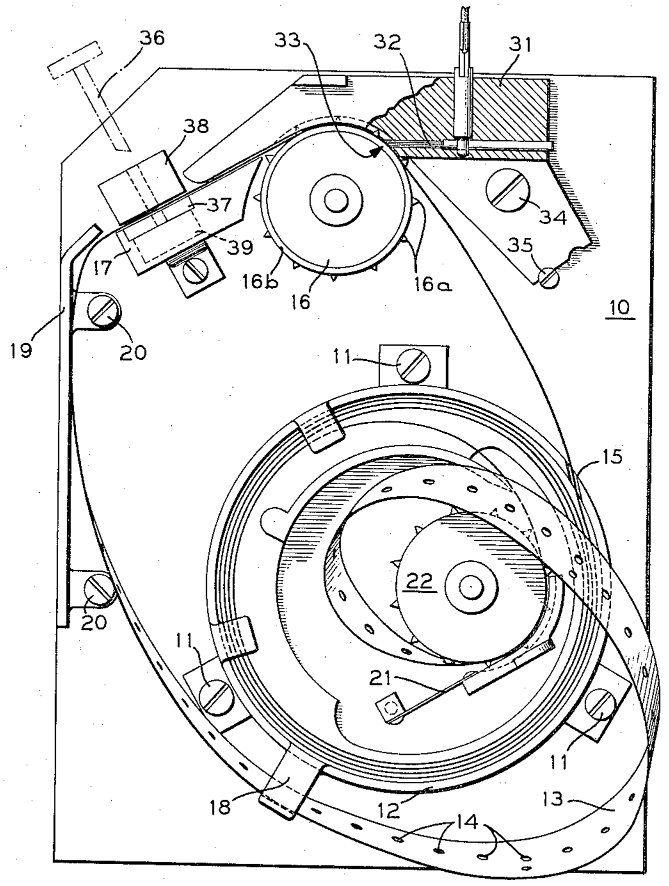
FIG. 1 is a front view of a form of program device according to this invention.
Figure 3:
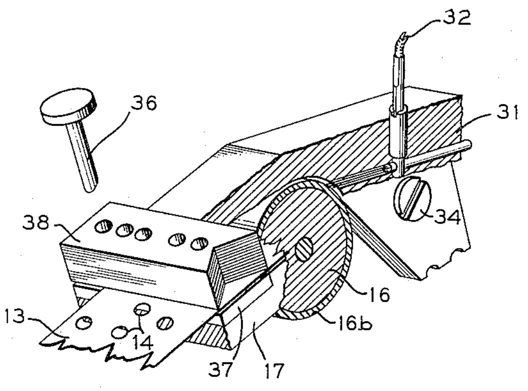
FIG. 3 is a perspective view of a tape punching mechanism attached to the program device.

Referring now to the drawings, there is shown a program device comprising a support plate 10 to which is removably attached by means of the screws 11 a tape housing or magazine 12 adapted for storing a spirally wound roll of endless program tape 13. The program tape 13 includes a plurality of evenly and longitudinally spaced sprocket feed holes 14. An outer convolution of the roll of program tape 13 extends from the opening 15 in the tape housing 12 and wraps about a tape read and feed drum 16 with the holes 14 of the tape 13 engaging the sprocket elements **16*a* of the tape read and feed drum 16. The program tape 13 further extends through a punch and die assembly 17 and under the tape guide projection 18. A guide plate 19 is fixedly attached to the support plate 10 by means of screws 20 and serves to keep the loop of endless program tape 13 within the confines of the peripheral limits of the support plate 10 in passing from the punch and die assembly 17 to the tape guide projection 18. The tape 13 after passing the guide projection 18 forms an overlapping loop with the tape passing between the tape guide 21 and the rewind drum 22. The rewind drum 22 feeds the tape 13 to the inner convolution or periphery of the roll of tape within the tape housing unit 12**.

Figure 2:
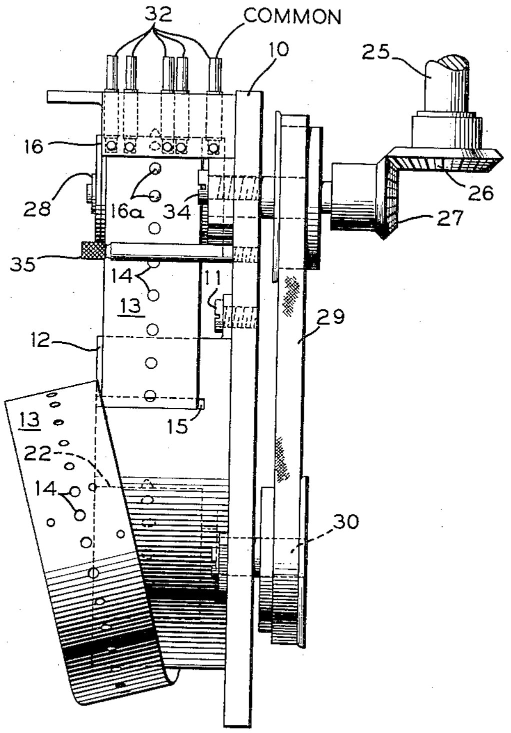
FIG. 2 is a side elevation view of the program device showing the driving mechanism therefor.

Referring to FIG. 2, the shaft 25 is positively driven by a time advance unit (not shown). The shaft 25 is coupled by the bevel gears 26 and 27 with shaft 28 to which the tape read and feed drum 16 is attached. The shaft 28 is connected by means of the belt 29 with shaft 30 to which the rewind drum 22 is attached. The rewind and read and feed rums 22 and 16, respectively, are rotatively driven in the same direction and at the same peripheral speed. The function of the rewind drum 22 is to feed the endless program tape 13 to the inner convolution of the coiled tape within the tape housing unit 12. The function of the read and feed drum 16 is to unreel the tape 13 from the outer convolution of the roll of coiled tape as well as serving as a contact roll which will be more fully described later on.

In the preferred embodiment of the invention the endless tape 13 represents the 1440 minutes of the day and through the time advancing mechanism is intermittently advanced at minute intervals. Consequently, the program device controls a schedule over a 24 hour period on a minute-to-minute basis. In the preferred embodiment the tape 13 is made of laminated plastic and paper which possesses excellent wearing qualities, and is dimensionally stable under varying atmospheric conditions. The tape is by no means limited to this particular construction.

The brush block 31 serves as a supporting element for a plurality of brushes 32 which are arranged in a line transverse of the read drum 16 to form a brush reading station 33. The brush block 31 is pivotally mounted on the pivot stud 34 and is held in the tape sensing position by means of the locking screw 35. The brush block 31 is pivotable in a clockwise direction about stud 34 and away from the read drum 16 to facilitate the loading and unloading of the program tape with respect to the program device. The outer layer 16b of the tape read and feed drum 16 is made of conductive material. One of the brushes 32 is a common brush and makes contact with the conductive surface 16b of the read drum 16 at all times. Each of the sensing brushes 32 is positioned to make contact with the conductive surface 16b of the read drum 16 whenever a sensing brush encounters a hole in the endless tape 13 thereby completing a control circuit.

A program may be easily set in the program tape 13 by selectively positioning perforations in the endless tape 13 by means of the punch and die assembly 17. The punch mechanism comprises three basic elements, namely, a punch 26, a die 37, and a stripper 38. The punch 36 is the piece that is urged through the tape 13 into the die 37 to cut the perforation in the tape. The die 37 serves as a base for the tape while it is being cut and helps to determine the shape of the hole. The stripper 38 serves as a guide for the punch 36 and is a means for stripping the paper tape from the punch 36 after the latter has cut the tape 13. A chip tray 39 is included in the assembly to catch the chips which are punched from the paper tape.

In the operative embodiment of the invention illustrated herein, means has been disclosed for intermittently moving the program tape at minute intervals in such a manner that the tape would ordinarily complete a revolution in each twenty-four hour period. Obviously, if longer or shorter program schedules are desired, the tape may be modified to make provision for the longer or shorter programs. The peripheral dimension of the tape housing unit 12 is determined by a combination of factors such as tape length, tape thickness and frictional resistance of the tape surfaces.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. In a program device the combination of an endless spirally coiled roll of tape, said tape having a plurality of longitudinally placed and evenly spaced tape feeding perforations and a plurality of circuit controlling perforations arranged according to a predetermined pattern, said roll of tape having a loop projecting therefrom; a tape housing unit having a peripheral wall with a slot therein providing exit means for said tape; means for removably securing said housing unit to the program device; a rotatable tape feed drum provided with a conductive surface and including a plurality of sprocket elements adapted to engage the tape feeding perforations in said tape for withdrawing said tape through the exit slot in the peripheral wall of the housing unit; tape sensing means including a plurality of tape sensing elements serving to complete a work circuit whenever a programming perforation in the tape is encountered thereby permitting the sensing element to come into contact with the conductive surface of said tape feeding drum; a rotatable rewind drum provided with a plurality of sprocket elements adapted to engage the tape feeding perforations in said tape for rewinding the utilized portion of said loop of tape to said roll of tape; and drive means connected with both of said drums for advancing the tape past said sensing means.

2. In a program device the combination of an endless spirally coiled roll of tape, said tape having a plurality of longitudinally placed and evenly spaced tape feeding perforations and a plurality of circuit controlling perforations arranged according to a predetermined pattern, said roll of tape having a loop projecting therefrom; a tape housing unit having a peripheral wall with a slot therein providing exit means for said tape; means for removably securing said housing unit to the program device; a rotatable tape feed drum provided with a conductive surface and including a plurality of sprocket elements adapted to engage the tape feeding perforations in said tape for withdrawing the outer convolution of said roll of tape through the exit slot in the peripheral wall of the housing unit; a tape sensing station including a plurality of tape sensing brushes and a common brush arranged in a line and biased for engagement with the conductive surface of said tape feed drum, said common brush being in engagement with the conductive surface of said tape feeding drum at all times, said sensing brushes individually serving to complete a work circuit whenever they encounter a programming perforation in the tape thereby coming in contact with the conductive surface of said tape feeding drum; a rotatable rewind drum provided with a plurality of sprocket elements adapted to engage the tape feeding perforations in said tape for rewinding the utilized portion of said loop of tape as an inner convolution of said roll of tape; and drive means connected with both of said drums for advancing the tape past said sensing station.

3. In a program device the combination of an endless spirally coiled roll of tape, said tape having a plurality of longitudinally placed and evenly spaced tape feeding perforations and a plurality of circuit controlling perforations arranged according to a predetermined pattern, said roll of tape having a loop projecting therefrom; a tape housing unit having a peripheral wall with a slot therein providing exit means for said tape; means for removably securing said housing unit to the program device; a rotatable tape feed drum disposed externally of said housing unit provided with a conductive surface and including a plurality of sprocket elements adapted to engage the tape feeding perforations in said tape for withdrawing the outer convolution of said roll of tape through the exit slot in the peripheral wall of the housing unit; a tape sensing station including a plurality of tape sensing brushes and a common brush arranged in a line and biased for engagement with the conductive surface of said tape feed drum, said common brush being in engagement with the conductive surface of said tape feeding drum at all times, said sensing brushes individually serving to complete a work circuit whenever they encounter a programming perforation the tape thereby coming in contact with the conductive surface of said tape feeding drum; a rotatable rewind drum disposed within said tape housing unit provided with a plurality of sprocket elements adapted to engage the tape feeding perforations in said tape for rewinding the utilized portion of said loop of tape as an inner convolution of said roll of tape; and drive means connected with both of said drums for intermittently advancing the tape past said sensing station.

4. In a program device the combination of an endless spirally coiled roll of tape, said tape having a plurality of longitudinally placed and evenly spaced tape feeding perforations and a plurality of circuit controlling perforations arranged according to a predetermined pattern, said roll of tape having a loop projecting therefrom; a tape housing unit having a peripheral wall with a slot therein providing exit means for said tape and a plurality of tape roll retaining elements depending from the side wall; means for removably securing said housing unit to the program device; a rotatable tape feed drum disposed externally of said housing unit provided with a conductive surface and including a plurality of sprocket elements adapted to engage the tape feeding perforations in said tape for withdrawing the outer convolution of said roll of tape through the exit slot in the peripheral wall of the housing unit; a tape sensing station including a plurality of tape sensing brushes and a common brush arranged in a line and biased for engagement with the conductive surface of said tape feed drum, said common brush being in engagement with the conductive surface of said tape feeding drum at all times, said sensing brushes individually serving to complete a work circuit whenever they encounter a programming perforation in the tape thereby coming in contact with the conductive surface of said tape feeding drum; a rotatable rewind drum disposed within said tape housing unit provided with a plurality of sprocket elements adapted to engage the tape feeding perforations in said tape for rewinding the utilized portion of said loop of tape as an inner convolution of said roll of tape; resilient means for biasing said tape into a cooperative engagement with the sprocket elements of the rewind drum; and drive means connected with both of said drums for intermittently advancing the tape past said sensing station.

5. In a program device, the combination of an endless spirally coiled roll of tape, said tape having a plurality of longitudinally placed and evenly spaced tape feeding perforations and a plurality of circuit controlling perforations arranged according to a predetermined pattern, a tape housing unit on said program device having a peripheral wall with a slot therein providing an exit for said tape, tape looping means including a rotatable tape feed drum provided with a conductive surface and including a plurality of sprocket elements adapted to engage the tape feeding perforations in said tape for withdrawing said tape through the exit slot in the peripheral wall of said housing unit, tape sensing means including a plurality of tape sensing elements serving to complete a work circuit whenever a programming perforation in the tape is encountered thereby permitting the sensing element to come into contact with the conductive surface of said tape feeding drum; a rotatable rewind drum provided with a plurality of sprocket elements adapted to engage the tape feeding perforations in said tape for rewinding the utilized portion of said loop of tape to said roll of tape; and drive means connected with both of said drums for advancing the tape past said sensing means.

6. In a program device the combination of an endless spirally coiled roll of tape, said tape having a plurality of longitudinally placed and evenly spaced tape feeding perforations and a plurality of circuit controlling perforations arranged according to a predetermined pattern, said roll of tape having a loop projecting therefrom; a tape housing unit having a peripheral wall with a slot therein providing exit means for said tape and a plurality of tape roll retaining elements depending from the side wall; means for removably securing said housing unit to the program device; a rotatable tape feed drum disposed externally of said housing unit and provided with a conductive surface and including a plurality of sprocket elements adapted to engage the tape feeding perforations in said tape for withdrawing the outer convolution of said roll of tape through the exit slot in the peripheral wall of the housing unit; a tape sensing station including a plurality of tape sensing brushes and a common brush arranged in a line and biased for engagement with the conductive surface of said tape feed drum, said common brush being in engagement with the conductive surface of said tape feeding drum at all times, said sensing brushes individually serving to complete a work circuit whenever they encounter a programming perforation in the tape thereby coming in contact with the conductive surface of said tape feeding drum; a rotatable rewind drum disposed within said tape housing unit provided with a plurality of sprocket elements adapted to engage the tape feeding perforations in said tape for rewinding the utilized portion of said loop of tape as an inner convolution of said roll of tape; resilient means for biasing said tape into a cooperative engagement with the sprocket elements of the rewind drum; drive means connected with both of said drums for intermittently advancing the tape past said sensing station; and a tape punching means attached to the program device and adapted to selectively introduce circuit controlling perforations into said endles tape.

References Cited in the file of this patent

UNITED STATES PATENTS

| | | |
|---|---|---|
| 2,042,599 | Heinis | June 2, 1936 |
| 2,229,100 | Lapsley | Jan. 21, 1941 |
| 2,290,280 | Freedman et al. | July 21, 1942 |
| 2,301,394 | Geissler | Nov. 10, 1942 |
| 2,618,694 | Black | Nov. 18, 1952 |
| 2,744,172 | Porter et al. | May 1, 1956 |
| 2,806,096 | Christopher | Sept. 10, 1957 |